Dec. 10, 1929.                J. G. DELY                1,739,217
                      SYNTHETIC AMMONIA PROCESS
                         Filed Sept. 19, 1923
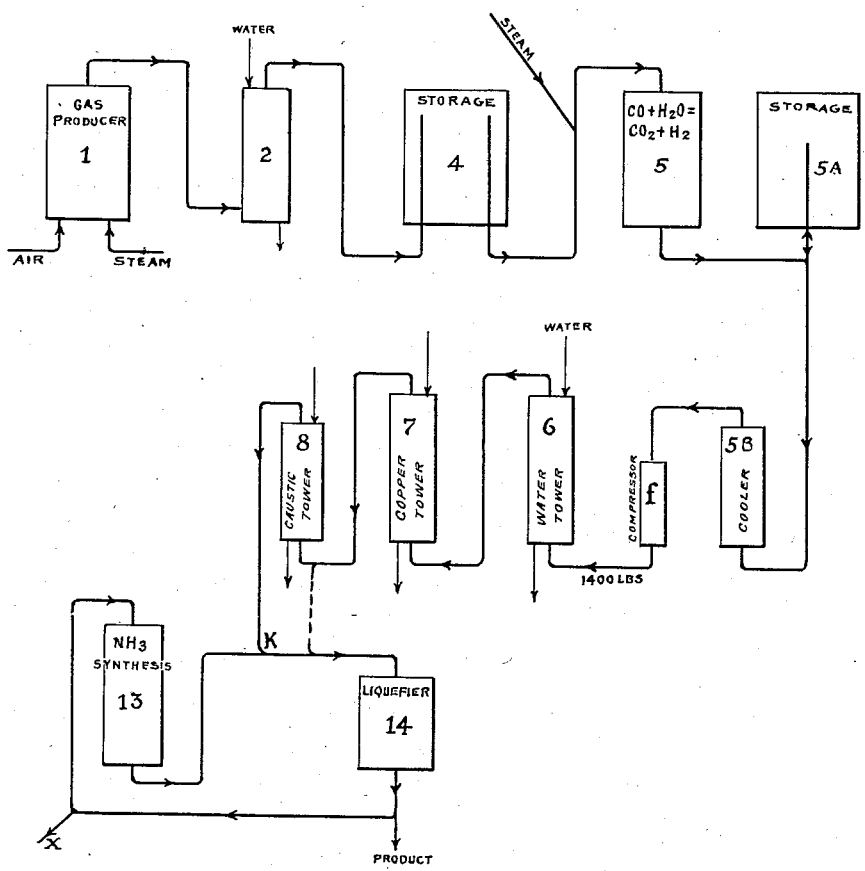
WITNESS                                              INVENTOR
                                                JOSEPH G. DELY
                                                     BY
                                                     ATTORNEYS Patented Dec. 10, 1929

1,739,217

UNITED STATES PATENT OFFICE

JOSEPH G. DELY, OF SYRACUSE, NEW YORK, ASSIGNOR TO ATMOSPHERIC NITROGEN CORPORATION, OF SOLVAY, NEW YORK, A CORPORATION OF NEW YORK

SYNTHETIC AMMONIA PROCESS

Application filed September 19, 1923. Serial No. 663,662.

The invention relates generally to the process for producing synthetic ammonia according to the De Jahn method, as described, for example, in Canadian Patent No. 201,059, issued June 15, 1920 to General Chemical, Company, on the application of Fredrik W. De Jahn. The object of the present invention is to simplify the said process as a whole and to relieve it of many of its operating difficulties.

The De Jahn process as modified by my invention is illustrated in the accompanying drawing in which crude gas is made in the gas producer 1 by the injection of regulated quantities of air and steam into and through incandescent coke therein. The resultant gas is washed in the usual manner in the water scrubber 2 whereby it is cooled and purified to a certain extent especially from solid constituents. This gas is then stored in the gas holder 4, from which it passes mixed with steam in regulated amount through the CO oxidation system 5. This air and steam injection at 1 and the operation of the CO oxidation system are so regulated that the gas from 5 contains hydrogen and nitrogen in the proper proportion for the subsequent ammonia synthesis. The gas from 5 is then compressed to approximately 1400 lbs. by the compressor $f$ after being first refrigerated if desired. A gas holder 5A floats on the gas line from 5 to maintain a constant supply of gas to the subsequent portion of the system and to take up any temporary excess gas production from 5. The gas is cooled in 5B to approximately 5° C. to increase the capacity of the compressor $f$. The cooled gas is compressed in $f$ to approximately 1400 pounds pressure and is then, under said pressure, first scrubbed with water in 6 and then with cuprous solution (for example, an ammoniacal cuprous carbonate solution) in 7 in the manner described in my U. S. Patent No. 1,597,345, issued August 24, 1926. The scrubbing operation in 6 is carried out at ordinary temperature while the copper purification step in 7 is preferably carried out at a reduced temperature (about 0° C.). The treatment in 7 is of such character that the gas from 7 is a purified nitrogen hydrogen mixture in the proper proportion and of the proper constitution for efficient ammonia synthesis when introduced into the synthesis system at K. The synthesis system consists of the synthesis step proper 13, and liquefiers 14 all arranged in the sequence as indicated in the flow sheet drawing. The proper proportion of inert gases is maintained in this system by bleeding regulated quantities of the gas from the system at $x$. In the line connecting 13 and 14 there may obviously be a gas circulating appliance such as a pump and filters or other suitable device for removing oil introduced by such pump. Preferably the purified gas will be passed through liquefied $NH_3$ before being introduced to the ammonia catalyst in 13 in the manner described in Canadian Patent No. 248,515, issued April 7, 1925, to Atmospheric Nitrogen Corporation on the application of Fredrik W. De Jahn, for final purification and/or it may be first scrubbed with caustic (NaOH) solution in 8 to remove $CO_2$ which may still remain in the gas from the copper system 7. Under certain circumstances such as an increase in the temperature of the scrubbing water or an increase in the gas flow, it may be desirable and simpler to scrub the gas with cold caustic solution after the water scrubber 6 for the purpose of removing $CO_2$ to the desired degree rather than to provide facilities for increasing the scrubbing capacity of the water and copper scrubbers as would otherwise be required under such circumstances.

In the foregoing process numerous details may obviously be varied. Thus the cooler 5B is not essential and may under certain conditions be omitted altogether. Again, if the $CO_2$ can be effectively removed from the gases before compression in $f$, the water scrubber 6 will not be required. In any event, however, the gases will pass through the cuprous purification stage in 7 and in said treatment be deprived of practically all of their active CO content by which is meant all such CO as would otherwise operate to defeat or injuriously affect the proper functioning of the subsequent catalysis.

According to the De Jahn system, (as illustrated in the De Jahn Canadian Patent No.

201,059 hereinabove referred to), the water scrubbing is followed by an elaborate treatment with hot caustic soda, the object of which is to remove CO and $CO_2$ from the gas. I have, however, found that this caustic treatment can be eliminated altogether and that by sending the gas from the water scrubber with substantially undiminished CO content through the cuprous solution at low temperature, it is possible to remove from the gases practically, if not wholly, the entire CO and $CO_2$ content thereof. Should it be desirable to remove the traces of $CO_2$ in the gas after it has passed through the cuprous solution, such traces can be removed by scrubbing with an alkaline solution such as cold caustic soda solution. By these means the entire purification stage of the De Jahn process is rendered capable of being operated as a cold process and there is no part of it which requires heating with the resultant troubles that arise particularly with respect to apparatus whenever a heating step is injected into a high pressure system like the one under consideration, especially when that heating step is intermediate between two cold steps. My new process also results in the elimination of the necessity of special driers between the cuprous tower 7 and the synthesis system. As a matter of fact, the entire procedure under the De Jahn general process is greatly improved and obviously simplified by the modifications of said process heretofore described by me.

While my invention has been illustrated with respect to its application to the De Jahn process and an operating pressure of approximately 1400 lbs., this is, of course, by way of example only. Pressure higher or lower than that particular pressure are not excluded. Further, the purification treatment of this application may obviously be carried out at one pressure and purified gas then subjected to still further compression prior to the ammonia synthesis step proper, as described, for example, in British Patent No. 145,058 of March 24, 1921. In brief, my invention is applicable broadly to a pressure synthetic ammonia process involving the preparation of nitrogen and hydrogen gases and their purification from CO and to pressures characteristic of such ammonia processes.

I claim:

1. In a synthetic ammonia process of the type in which a gas mixture of hydrogen and nitrogen in proportions suitable for ammonia synthesis and accompanied by impurities, including CO, is first prepared and then subjected to pressure under which pressure impurities injurious to the ammonia synthesis are abstracted, the purified gas being subjected to ammonia synthesis under pressure followed by liquefaction of the ammonia and return of the residual unconverted gas to ammonia synthesis, the improvement which comprises passing the first named gas mixture with substantially undiminished CO content into contact with cold ammoniacal cuprous solution refrigerated to approximately 0° C. and applying said treatment until practically all the active CO content of the gas is removed from the gas, whereby a gas of such constitution is obtained that when introduction into the gas stream flowing from the ammonia converter to its liquefaction system, it will, on reaching the catalyst, react effectively and without materially reducing the sensitiveness of the catalyst.

2. In the art of preparing a gas containing small percentages of carbon monoxide for industrial uses requiring a substantially complete absence of carbon monoxide in the gas, the process which comprises bringing the gas containing the carbon monoxide into contact, under high pressure, with an ammoniacal cuprous solution refrigerated to a temperature at least as low as approximately zero degree C.

In testimony whereof I have hereunto set my hand.

JOSEPH G. DELY.